United States Patent
Meid et al.

(10) Patent No.: US 11,371,620 B2
(45) Date of Patent: Jun. 28, 2022

(54) HYDRAULIC CONTROL VALVE UNIT

(71) Applicant: DEERE & COMPANY, Moline, IL (US)

(72) Inventors: Michael Meid, Waghaeusel (DE); Sebastian Traut, Langenfeld (DE)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 17/115,861

(22) Filed: Dec. 9, 2020

(65) Prior Publication Data
US 2021/0088146 A1    Mar. 25, 2021

Related U.S. Application Data

(63) Continuation of application No. 16/291,133, filed on Mar. 4, 2019, now Pat. No. 10,955,057.

(51) Int. Cl.
| | |
|---|---|
| *F16K 11/02* | (2006.01) |
| *F15B 13/04* | (2006.01) |
| *F16K 11/07* | (2006.01) |
| *F16K 11/078* | (2006.01) |
| *F15B 13/044* | (2006.01) |

(Continued)

(52) U.S. Cl.
CPC .......... *F16K 11/02* (2013.01); *F15B 13/0402* (2013.01); *F15B 13/0406* (2013.01); *F16K 11/078* (2013.01); *F16K 11/0708* (2013.01); *F15B 13/021* (2013.01); *F15B 13/0444* (2013.01); *F15B 2013/008* (2013.01); *F15B 2013/0413* (2013.01); *F15B 2211/3127* (2013.01)

(58) Field of Classification Search
CPC .... F16K 11/02; F16K 11/0708; F16K 11/078; F15B 13/0402; F15B 13/0406
See application file for complete search history.

(56) References Cited

U.S. PATENT DOCUMENTS

4,364,302 A    12/1982  Thomsen
4,479,512 A    10/1984  Ohrendorf
(Continued)

FOREIGN PATENT DOCUMENTS

GB        919145 A    2/1963

OTHER PUBLICATIONS

European Search Report, European Patent Office, European Patent Application No. 19161213.4, dated Jul. 10, 2019, 7 pages.

*Primary Examiner* — Kevin R Barss
(74) *Attorney, Agent, or Firm* — Taft Stettinius & Hollister LLP; Stephen F. Rost

(57) ABSTRACT

A hydraulic control valve unit includes an input port hydraulically coupled to a pump, a working port hydraulically coupled to the working load, and a return port connected to a hydraulic tank. The unit includes a control slide movable into different working positions in an axial direction for controlling a hydraulic flow between the hydraulic ports and a slide housing surrounding the control slide. The control slide includes a control segment which is delimited in the axial direction by a control edge, and cooperates with an axial housing segment of the slide housing for controlling a flow cross section for hydraulic flow at the control segment. The control slide is rotationally driven about an axis of rotation in a rotational direction. The control edge of the control segment or the housing segment cooperating with the control segment is designed such that the flow cross section has a different size depending on a rotational position of the control slide.

19 Claims, 5 Drawing Sheets

(51) Int. Cl.
 *F15B 13/02* (2006.01)
 *F15B 13/00* (2006.01)

(56) References Cited

U.S. PATENT DOCUMENTS

| | | |
|---|---|---|
| 4,616,675 A | 10/1986 | Amrhein |
| 6,158,465 A | 12/2000 | Lambert |
| 6,470,913 B1 | 10/2002 | Woodworth |
| 7,578,313 B2 | 8/2009 | Kozuka et al. |

HYDRAULIC CONTROL VALVE UNIT

RELATED APPLICATIONS

This application is a continuation of U.S. patent application Ser. No. 16/291,133, filed Mar. 4, 2019, which claims priority to German Patent Application Ser. No. 102018203436.2, filed Mar. 7, 2018, the disclosures of which are hereby incorporated by reference in their entirety.

FIELD OF THE DISCLOSURE

The present disclosure relates to a hydraulic control valve unit for actuating a hydraulic operating load.

BACKGROUND

A control valve unit has an axially displaceable control slide for controlling a hydraulic flow, e.g., from a hydraulic pump connected to the control valve unit to the likewise connected hydraulic operating load. Different axial operating positions of the control slide are used to regulate or control the hydraulic flow between the pump, the operating load and a hydraulic tank with respect to direction and quantity.

There is a need, however, for improving the hydraulic functionality of the control valve unit.

SUMMARY

In one embodiment of the present disclosure, a hydraulic control valve unit has a plurality of hydraulic ports for actuating a hydraulic operating load. These hydraulic ports include at least one input port for hydraulic connection to a hydraulic pump, which pumps hydraulic fluid (oil for example) through the control valve unit to the operating load. The hydraulic ports further include at least one working port for hydraulic connection to the hydraulic connector of the operating load, and at least one return port that can be connected to an external hydraulic tank or sump. To control the hydraulic flow between the hydraulic ports, the control valve unit has a control slide that can be transferred in the axial direction into different working positions. For example, the system pressure can be brought to the working ports in this way. The control slide cooperates with a slide housing that surrounds the control slide. Individual ports can be hydraulically connected to one another by means of the slide housing depending on the respective working position of the control slide.

The control slide has at least one control segment, which is delimited in the axial direction by a control edge and interacts with an axial housing segment of the slide housing to control a flow cross section for hydraulic flow at this control segment. In addition to its axial displaceability, the control slide can also be driven rotationally in a rotational direction about an axis of rotation that runs parallel to the axial direction. The control edge of at least one control segment, or the housing segment cooperating with this control segment, is designed such that the flow cross section for hydraulic flow at this control segment has different sizes depending on the different rotational positions of the control slide.

A single axial working position of the control slide can consequently include several different rotational working positions of the control slide at a control segment, with correspondingly different hydraulic and technical effects.

In other words, different rotational positions of a geometrically appropriately shaped control edge or a geometrically appropriately shaped housing segment enable different flow cross sections for the hydraulic flow at this control segment.

In this way, the functionalities of the control valve unit (e.g., adjusting hydraulic-physical variables, hydraulic response behavior, control of the volume flow or the flowing hydraulic quantity, number of different hydraulic operating positions/states) can be expanded. The control slide that is used ensures that this functional expansion in relation to conventional control valve units can be created with low technical effort and thus cost-effectively.

In summary, flow cross sections for hydraulic flow between the hydraulic ports during working operation of the control valve unit can be adjusted differently, by providing a suitable geometric dimensioning of the control edge of at least one control segment or a suitable geometric dimensioning of the axial housing segment of the slide housing that interacts with this control segment.

To adjust different functionalities of the control valve unit, defined angles of rotation by which the control unit can be driven by means of a suitable drive unit are provided. Depending on the respective technical application of the control valve unit, it is possible to vary the axial displacement paths, the flow cross sections and the angles of rotation of the control slide, in order to implement the desired functionalities of the control valve unit.

The control slide can have multiple control segments arranged in the axial direction. On at least one of these control segments, the flow cross section for hydraulic flow is differently sized depending on different rotational positions of the control slide. In this way, a suitable control slide can be provided for different control valve units with different functionalities.

In particular, the control slide has at least two control segments, of which at least one control segment enables a constant flow cross section for hydraulic flow at different rotational positions of the control slide. A control slide of this kind creates the prerequisite for being able to provide, with an unchanged flow cross section in at least one control segment, different-sized flow cross sections on at least one additional control segment of the control slide. The variation possibilities with respect to the hydraulic functionality of the control valve unit are further increased in this way.

In particular, an unchanged flow cross section in one control segment with different flow cross sections in at least one additional control segment due to rotational movements of the control slide can be implemented by a control edge of the control segment that has a regular profile, e.g., a regular zigzag line, partially or entirely along the circumferential direction or the rotational direction.

The concept of different flow cross sections for hydraulic flow at one control segment for different rotational positions of the control slide can be applied to functionally different control segments within a control valve unit.

One control segment is a regulating control segment that is arranged in an outflow region of the slide housing. This outflow region connects the input port or a connecting duct directly adjoining it to the slide housing. The regulating control segment can control the hydraulic flow coming from the input port. Depending on the desired functionality, a constant or a different-sized flow cross section for hydraulic flow can be realized with rotational movements of the control slide at the regulating control segment. For example, a constant flow cross section is present at the regulating control segment for one rotating control slide, whereas the flow cross section has differing sizes in at least one further control segment. Thus, different functionalities can be achieved for constant hydraulic conditions on the regulating control segment, e.g., a continuously variable increase of the flow cross section or throttling in the region of additional control segments.

For example, turning or rotating the control slide in an axial working position can have the effect that, with an unchanged flow cross section at the regulating control segment, the flow cross section at a so-called outlet control segment arranged between the working port and the return port can be increased in order to reduce a hydraulic back-pressure in the direction of the return port and the hydraulic tank. Conversely, the flow cross section at the outlet control segment can be reduced in a targeted manner with an appropriate rotation of the control slide, in order to achieve throttling in the direction of the hydraulic tank. This brings about an increased back-pressure, which can reduce or avoid flow-induced cavitation effects and consequent stresses on seals and other components of the control valve unit.

Different functions or states of the control valve unit can also be achieved if the flow cross section at the regulating control segment is equal to zero and thus remains closed, i.e., if hydraulic fluid coming from the input port cannot continue to flow at the regulating control segment. By rotation of the control slide at the already mentioned outlet control segment, for example, the flow cross section can be opened so that the working port and the return port are hydraulically connected to one another. This principle can also be extended to a second working port and a second return port by means of an additional outlet control segment. In this manner, so-called floating positions of the control valve unit can be achieved directly, solely by rotation of the control slide, without first having to move the control slide past different functional positions or axial working positions by axial displacement before it reaches the floating position.

In another embodiment of the regulating control segment, the flow cross section at the regulating control segment can be of different sizes in one axial working position by turning or rotating the control slide. Thereby, the control valve unit achieves a larger flow opening in the outflow area of the slide housing, lower pressure losses and consequently a higher efficiency. In this variant, the flow cross section is constant in at least one additionally present control segment (e.g., the above-mentioned outlet control segment) so that no specific geometry of the control edge or the housing segment for different flow cross sections is necessary there when rotating the control slide.

The above explanations of the regulating control segment with either a constant or a different flow cross section for a rotating control slide and a combination with additional control segments can be applied accordingly to other control segments of the control slide. For example, this can be a so-called inlet control segment, which is arranged hydraulically upstream from the working port and can control the hydraulic flow to the working port. In another application, the control segment is a so-called outlet control segment, which is arranged hydraulically between the working port and the return port and can control the hydraulic flow to the return port.

In particular, the control slide has two outlet control segments, each of which is associated with one of two available working ports. In this way, the hydraulic connection between each working port and the associated return port can be controlled. Depending on the desired mode of operation of the control valve unit, the two outlet control segments and their outlet control edges can be geometrically dimensioned differently or identically.

In another embodiment, the control slide has two outlet control segments which are arranged mirror-symmetrically relative to one another with respect to a plane of symmetry arranged perpendicular to the axial direction. This supports technically simple production of the control slide and a uniform mode of operation of the control valve unit between the working ports and the return ports.

To implement different flow cross sections at a control segment or at the housing segment cooperating therewith, the control edge of this control segment may be provided with a non-uniform or asymmetric geometric profile in the circumferential direction or the rotational direction (i.e., along the geometrical development) which, in contrast to a symmetrical control edge, would bring about an equal-sized flow cross section at this control segment during rotation of the control slide, independently of the angle of rotation.

The geometrical profile of the control edge is such that the edge has at least one axially outer edge portion and at least one axially inner edge portion. The axially inner edge portion is offset axially inward relative to the axially outer edge portion, whereby the control segment has a lesser axial extent in the region of the inner edge portion than in the region of the outer edge portion. This axially offset arrangement of edge portions of the control edge can be implemented by various geometries, for example, by straight-line portions or by wave-shaped, more particularly sinusoidal line portions.

The desired non-uniform geometrical progression of the control edge along the rotational direction is easily supported in terms of design in that the axially inner edge portion, or all axially inner edge portions, extends or extend along the rotational direction by less than 180° as viewed in a 360° developed view of the outlet control segment.

In a further embodiment, the axially inner edge portion runs partially or completely along the rotational direction parallel to the rotational direction. This supports an easily produced manufacture of the control segment for differently sized flow cross sections.

Further, the axially inner edge portion runs along the rotational direction, at least in part, at an angle greater than 0° and less than 90° relative to the rotational direction. In this way, the flow cross section can be adjusted continuously and therefore even more variably. This can be used, for example, to modify the flow cross section at a control segment within the same operating position of the control valve unit as needed, if the hydraulic flow or the volume flow is to be influenced.

Different flow cross sections at a control segment, or at the housing segment cooperating therewith, can be achieved by different rotational positions of the control slide if the geometric structure of the cooperating axial housing segment is designed correctly. This can be accomplished independently of or in combination with a specific control edge geometry. An adaptation of this kind is that the housing segment cooperating with a control segment, more particularly in the region of the already mentioned axially inner edge portion of the control edge, has a greater axial extent than the largest axial extent of the control segment.

Functionalities of the control valve unit are controlled in particular by at least one of an operating lever for a user, an electronic control unit, signals of an electronic bus (e.g., a CAN bus) or a stepper motor.

The stepper motor may convert electronic input signals into proportional output signals or mechanical movements. In this case, the stepper motor is coupled in a suitable manner (e.g., by means of a toothed rack) to the control slide, in order to transfer the control slide into different axial working positions. The same stepper motor, or alternatively an additional suitable drive unit (e.g., stepper motor, spindle drive), rotationally drives the control slide in the rotational direction. Different functionalities of the control valve unit are each associated with defined rotational angles of the control slide, which are effected by the drive unit.

The control valve unit is installed in an agricultural vehicle, more particularly a tractor, and acts there as a hydraulic control device. Different hydraulic loads (e.g., hydraulic motor, front loader, three-point hitch, manure spreader, additional attached implements) on the agricultural vehicle can be actuated in this way. For example, increases of efficiency due to reduced residual pressures can be achieved on such loads. For certain loads (e.g., front loader), possible cavitation can be avoided in a technically simple manner.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
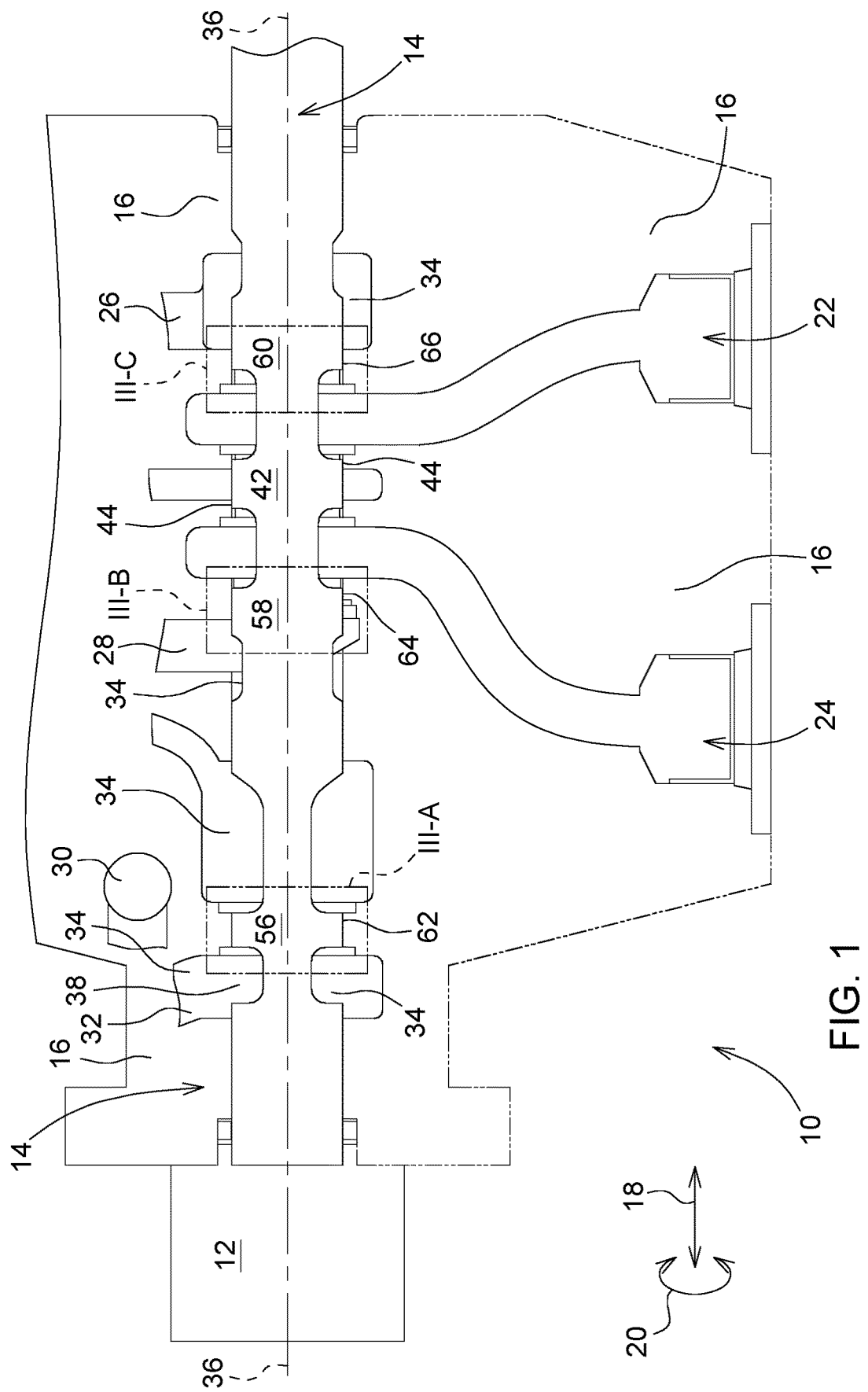
FIG. 1 shows a plan view of a partially represented control valve unit with a view of essential components within a control valve housing of the control valve unit.

FIG. 1 shows a control valve unit 10 with a merely schematically represented drive unit 12 for driving a control slide 14. Outside the drive unit 12, a control valve housing 16 of the control valve unit 10 is opened and reveals a view of components of the control valve unit 10.

The drive unit 12 may include at least one stepper motor for driving the control slide 14. Depending on its actuation, the control slide 14 can be moved translationally in an axial direction 18 and rotatably in the rotational direction 20 about an axis of rotation 36 running parallel to the axial direction. Two working ports 22, 24 for hydraulic connection of a hydraulic working load not shown here (e.g., a double acting cylinder) are arranged on the control valve housing 16. The first working port 22 corresponds to the function "extend cylinder" with respect to the working load, while the second working port 24 corresponds to the function "retract cylinder" with respect to the working load. Depending on the defined working positions of the control slide 14, the two return ports 26, 28 can be hydraulically connected to the working ports 22, 24. Both hydraulic ports 26, 28 are connected to an external hydraulic tank or sump (not shown) for hydraulic fluid (e.g., oil).

An input port 30 is connected to a hydraulic pump (not shown) that delivers hydraulic fluid from the hydraulic tank to the control valve unit 10. The input port 30 is connected hydraulically by a connection duct 32 to an outflow region 38 of the slide housing 34. The slide housing 34 surrounds the control slide 14 in the circumferential direction thereof, i.e., in the rotational direction 20, by a radial distance. The radial distance varies in the axial direction 18 between a minimum in order to guarantee axial movability of the control slide 14 relative to the slide housing 34, and larger radial distances, which enable flow of hydraulic fluid through the slide housing 34. Thus, the input port 30, the working ports 22, 24 and the return ports 26, 28 can be hydraulically connected to one another depending on the desired functionality of the control valve unit 10 and the respective axial or rotational working position of the control slide 14.

The drive unit 12 or the stepper motor thereof is drivingly connected to the control slide 14, (e.g., via a toothed rack). The drive unit 12 converts electronic input signals into mechanical movements of the control slide 14. These mechanical movements are linear or axial movements in the axial direction 18 and rotational movements about the axis of rotation 36 along the rotational direction 20. The drive unit 12 uses either the same stepper motor for the axial and rotational movements of the control slide 14, or the stepper motor generates the axial movements, while an additional drive unit (e.g., a second stepper motor, spindle drive, etc.) generates the rotational movements.

With respect to the functionalities of the control valve unit 10, the drive unit 12 moves the control slide 14 into different operating positions such as neutral position, extension position (extend cylinder), retracted position (retract cylinder), floating position and optionally additional adjustable intermediate positions. In this way, the hydraulic flow can be controlled and regulated with respect to flow direction and flow quantity between the input port 30, the working ports 22, 24 and the return ports 26, 28.

In the "extension position" operating state, the control slide 14 has been moved axially to the left with respect to the position in FIG. 1. In this way, hydraulic fluid can flow from the input port 30 via the outflow region 38 between the control slide 14 and the slide housing 34 to the first working port 22. Hydraulic fluid from the second working port 24 can flow between the control slide 14 and the slide housing 34, as well as via the associated return port 28 to the hydraulic tank.

In the "retraction position" operating state, the control slide 14 has been moved axially to the right relative to the position in FIG. 1. In this position of the control slide 14, hydraulic fluid can flow from the input port 30 via the outflow region 38, between the control slide 14 and the slide housing 34 to the second working port 24. Hydraulic fluid from the first working port 22 can flow between the control slide 14 and the slide housing 34, as well as via the associated return port 26 to the hydraulic tank.

Figure 2:
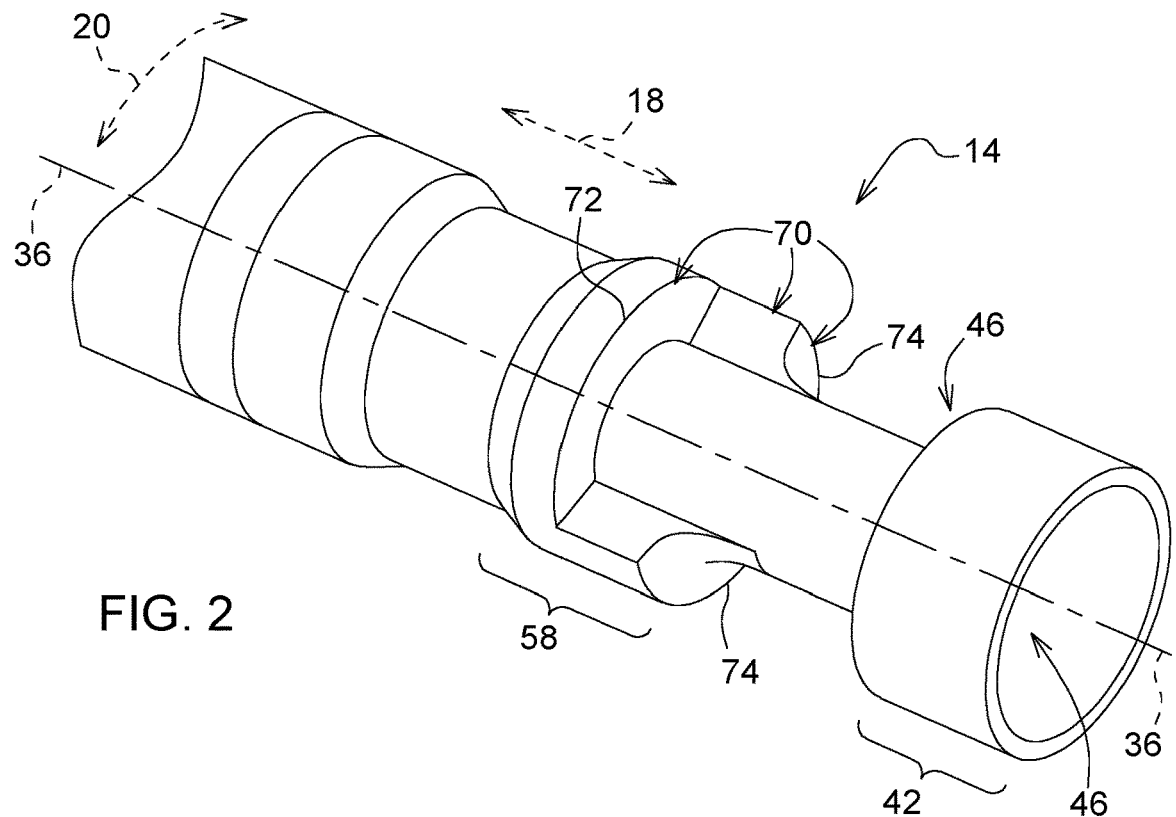
FIG. 2 shows a perspective partial representation of a first embodiment of the control slide used in the control valve unit.

FIG. 2 illustrates the control slide 14 in a cut-out with an outlet control segment 58 and with an inlet control segment 42. Along the axial direction 18, the control slide 14 according to FIG. 1 has a regulating control segment 56, the outlet control segment 58, the inlet control segment 42, and an additional outlet control segment 60.

Figure 3A:
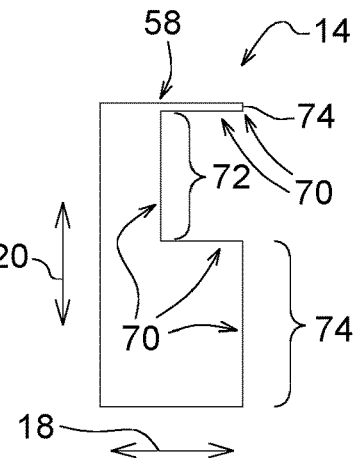
FIG. 3a shows an enlarged developed view of a regulating control segment according to detail III-A in FIG. 1.
Figures 3B, 3C:
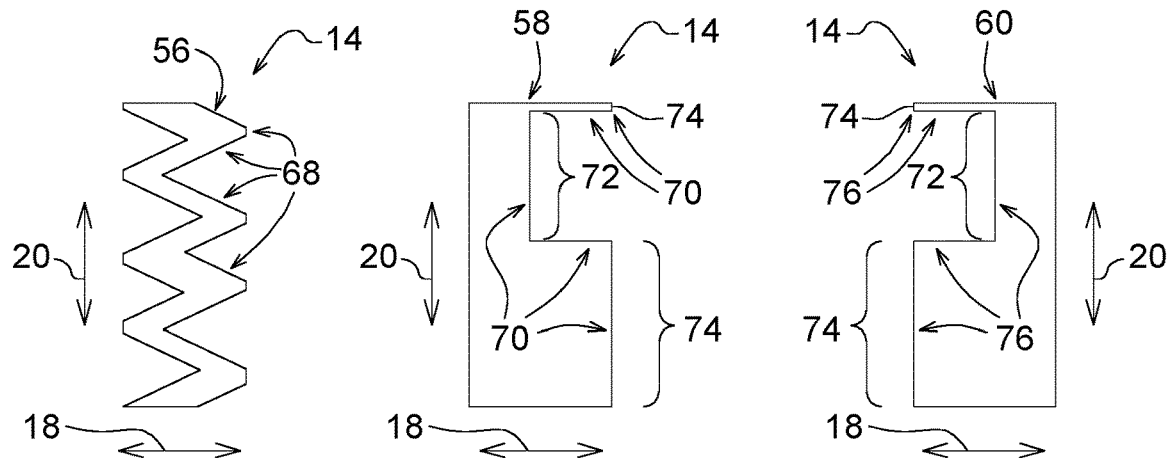
FIG. 3b shows an enlarged developed view of a regulating control segment according to detail III-B in FIG. 1.
FIG. 3c shows an enlarged developed view of a regulating control segment according to detail III-C in FIG. 1.

The control segments 56, 58, 60 are shown in FIGS. 3a, 3b and 3c as 360° developed views along the rotational direction 20, or the circumferential direction of the control slide 14. The individual control segments 56, 58, 60 are respectively arranged in the regions of details III-A, III-B, III-C in FIG. 1. The outlet control segment 58 is arranged in the hydraulic connection between the second working port 24 and the associated return port 28, while the outlet control segment 60 is arranged in the hydraulic connection between the first working port 22 and the associated return port 26.

The two outlet control segments 58, 60 in the embodiment according to FIGS. 3b and 3c, and in FIGS. 5-10, are arranged mirror-symmetrically relative to one another with respect to a plane of symmetry running perpendicular to the axial direction 18. In additional embodiments, the two outlet control segments 58, 60 can be arranged asymmetrically relative to one another and constructed differently, depending on the technical application and the dimensioning of the control valve unit 10.

The slide housing 34 has a regulating housing segment 62, an inlet housing segment 44, and two outlet housing segments 64, 66. The hydraulic flow (in particular, the flow quantity of the hydraulic fluid, the volume flow, etc.) at the housing segments 44, 62, 64, 66 can be controlled on the basis of axial or rotational changes of position of the control slide 14.

The control segments 42, 56, 58, 60 each cooperate with one of the housing segments 44, 62, 64, 66 in order to control the flow cross section for hydraulic fluid at the respective housing segment 44, 62, 64, 66, i.e., to enlarge or reduce it, wherein the reduction can go to zero. The control segments 42, 56, 58, 60 are each delimited in the axial direction 18 by at least one control edge 46, 68, 70, 76. The specific profile thereof can determine the flow cross section, depending on the geometric design along the rotational direction 20.

The regulating control segment 56 according to FIG. 3a has a regulating control edge 68 with a substantially zigzag profile along the rotational direction 20. The outlet control segment 58 according to FIG. 3b has an outlet control edge 70. The latter has two axially outer edge portions 72 along the rotational direction 20, and an axially inner edge portion 74 offset axially inward therefrom. The outlet control segment 60 has an outlet control edge 76 which, due to the mirror-symmetric structure of the outlet control segment 60 relative to the outlet control segment 58, likewise contains the two axially outer edge portions 74 and the axially inner edge portion 72. The axially inner edge portion 72 extends along the rotational direction 20 by less than 180° relative to the 360° developed view of the entire outlet control segment 58 or 60 along the rotational direction 20. The axially inner edge portion 72 also runs parallel to the rotational direction 20.

Figure 4:
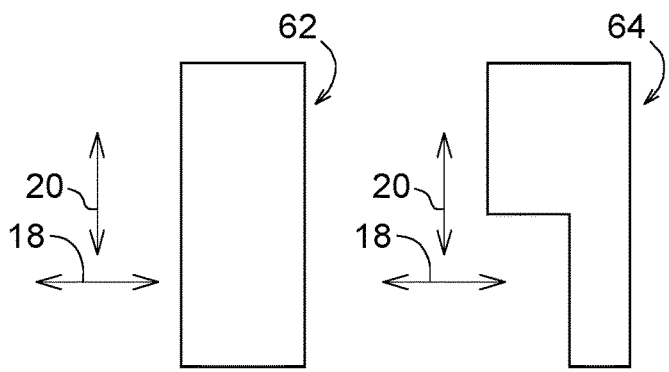
FIG. 4 shows three axial portions of a slide housing, each as a developed view of a housing segment that cooperates with the respective associated control segment according to FIG. 3a or FIG. 3b or FIG. 3c.

The housing segments 44, 62, 64, 66 shown in FIG. 1 are represented in FIG. 4 (analogously to the control segments 56, 58, 60 in FIGS. 3a, 3b and 3c) as 360° developed views of the housing segments 62, 64, 66 along the rotational direction 20.

The regulating control segment 56 is arranged in the outflow region 38 of the slide housing 34. Depending on an adjusted working position of the control slide 14 and thus an axial relative position of the regulating control segment 56 relative to the regulating control segment 62, the regulating control edge 68 influences whether and how much hydraulic fluid flows from the input port 30 through the regulating control segment 62.

The outlet control segment 58 is associated with the second working port 24 and the return port 28, while the outlet control segment 60 is associated with the first working port 22 and the return port 26. Depending on the respective axial or rotational relative positions of the outlet control segments 58 and 60 relative to the outlet control segment 64 or 66, respectively, the outlet control edge 70 or 76 respectively influences whether and how much hydraulic fluid flows through the respective automatic control segment 64 or 66 to the respective working port 24 or 22 or to the respective return port 28 or 26.

Figure 5:
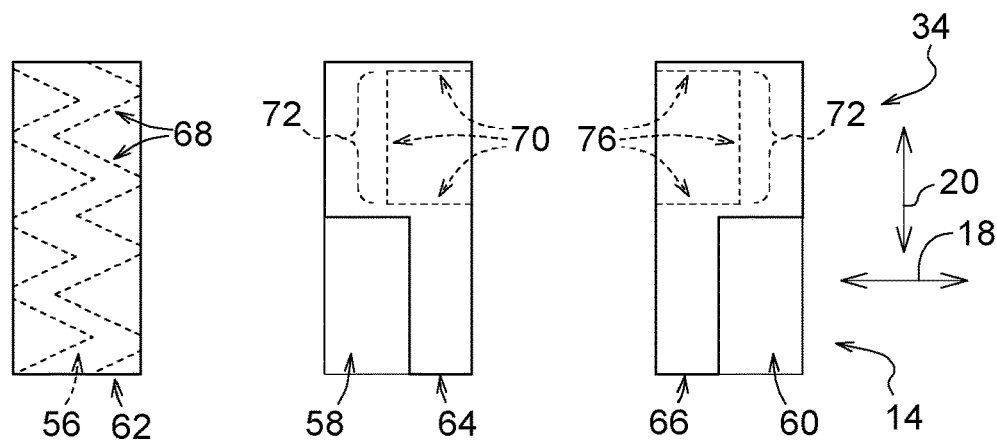
FIG. 5 shows the developed views according to FIG. 3a, FIG. 3b, FIG. 3c and FIG. 4 in a first working position of the control slide.

The positions of the regulating control segment 56 and the outlet control segments 58, 60 in FIG. 5 are such that no hydraulic fluid flows through the respective housing segment 62, 64, 66. The flow cross section for the hydraulic flow at the housing segment 62, 64, 66 is therefore equal to zero. In particular, this working position of the control slide 14 corresponds to a "neutral position" operating state of the control valve unit 10.

Figure 6:
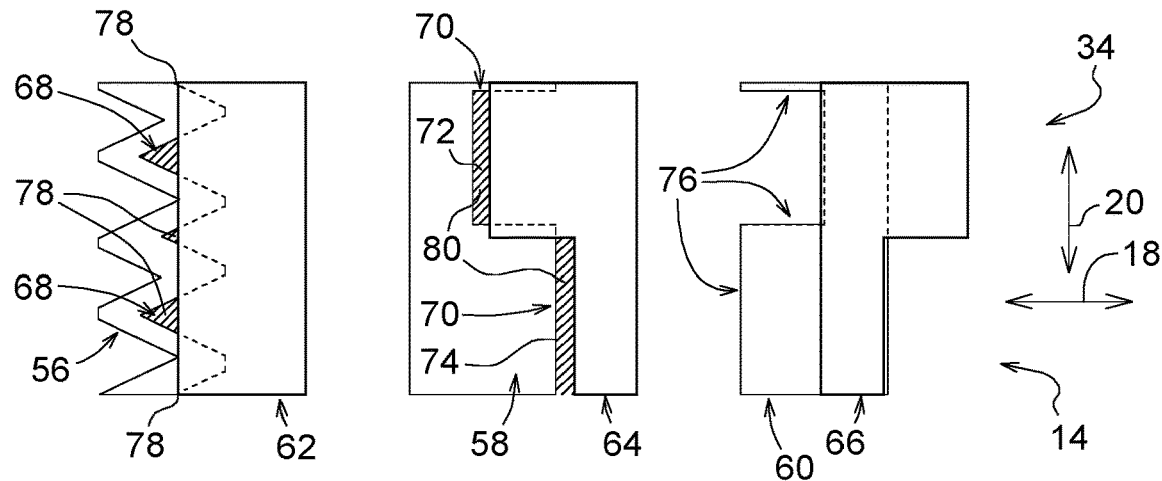
FIG. 6 shows the developed views according to FIG. 3a, FIG. 3b, FIG. 3c and FIG. 4 in an additional working position of the control slide.

Proceeding from FIG. 5, the control slide 14 in FIG. 6 has been shifted axially to the left. No rotational movement of the control slide 14 has been carried out. Therefore, a flow cross section 78 greater than zero arises at the regulating housing segment 62. The total surface area of the regulating flow cross section 78 corresponds to the sum of the five cross-hatched triangular areas. The axial displacement of the control slide 14 according to FIG. 6 results in an outlet flow cross section 80 at the outlet housing segment 64 that is greater than zero, the cross-sectional area of which results from the two hatched rectangular areas. The working position of the control slide 14 according to FIG. 6, for example, brings about a hydraulic flow from the input port 30 to the first working port 22 and a hydraulic flow from the second working port 24 to the return port 28.

Figure 7:
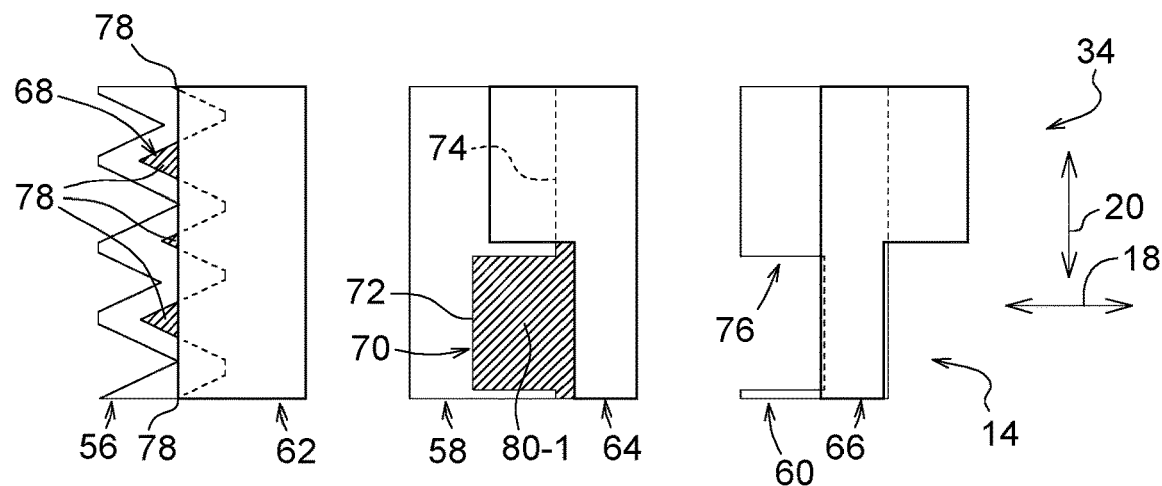
FIG. 7 shows the developed views according to FIG. 3a, FIG. 3b, FIG. 3c and FIG. 4 in an additional working position of the control slide.

Proceeding from FIG. 5, the control slide 14 in FIG. 7 has been shifted axially to the left and rotated by 180° along the rotational direction 20. In FIG. 7, this results in an outlet flow cross section 80-1, shown as a hatched area in FIG. 7, at the outlet segment 64 that is larger than the flow cross section in FIG. 6. The size of the regulating flow cross section 78 remains unchanged due to the uniform symmetrical profile of the regulating control edge 68 in the rotational direction 20. In this way, the hydraulic flow cross section between the second working port 24 and the return port 28 can be increased if necessary, with unchanged hydraulic conditions at the regulating control segment 62. Consequently, the flow resistance and the back pressure within this hydraulic connection are reduced.

Figure 8:
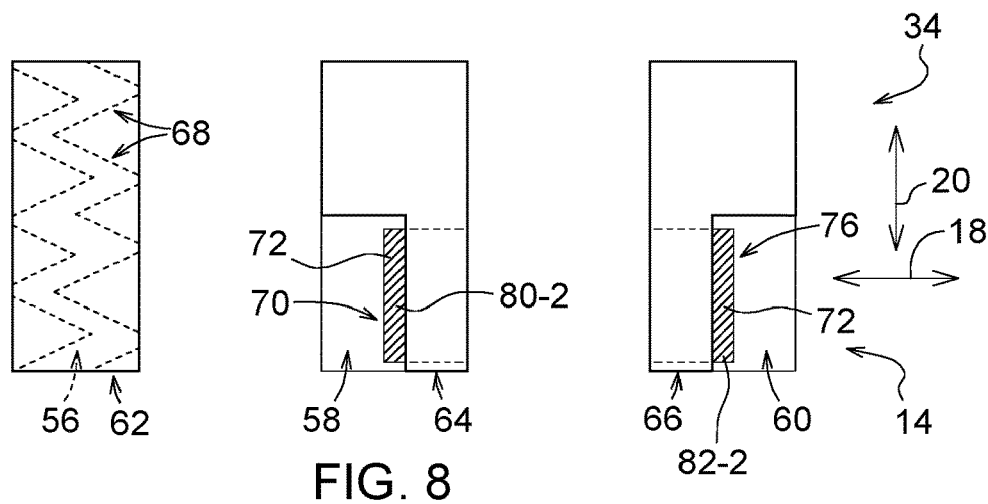
FIG. 8 shows the developed views according to FIG. 3a, FIG. 3b, FIG. 3c and FIG. 4 in an additional working position of the control slide.

Proceeding from FIG. 5, the control slide 14 in FIG. 8 has been rotated by 180° along the rotational direction 20. The hydraulic flow at the regulating housing segment 62 therefore remains blocked or interrupted. Due to the rotational movement of the control slide 14, however, respective flow cross sections 80-2 and 82-2 have been achieved at the respective outlet housing segments 64 and 66. The first working port 22 and the return port 26 are connected hydraulically to one another, and the second working port 24 and the return port 28 are connected hydraulically to one another. The two working ports 22, 24 are thus connected hydraulically to one another via the hydraulic tank connected to the return ports 26, 28. The working position of the control slide 14 according to FIG. 8, for example, can thus achieve a floating position as the operating position of the control valve unit 10 with a single rotational movement. Consequently, conventionally necessary space-intensive axial position changes of the control slide 14 while crossing other operating positions are avoided when a functionality according to FIG. 8 (e.g., floating position) is to be adjusted for the control valve unit 10.

Figure 9:
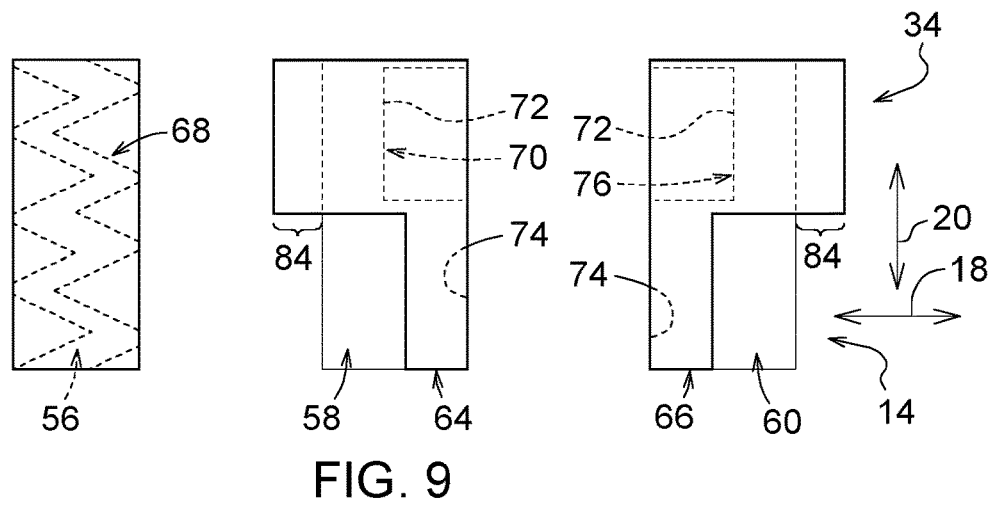
FIG. 9 shows the developed views according to FIG. 3a, FIG. 3b, FIG. 3c and FIG. 4 of the first working position of the control slide according to FIG. 5, but in an additional embodiment of the slide housing.

In comparison to the slide housing 34 according to FIG. 5, the outlet housing segments 64, 66 in the embodiment according to FIG. 9 have longer dimensions in the axial direction 18. The outlet housing segments 64, 66 in this case are each axially lengthened by a housing protrusion 84 in the region of the axially inner edge portion 72. The outlet housing segments 64, 66 thus have a larger axial extent in the region of the axially inner edge portion 72 than the largest axial extent of the outlet control segments 58, 60.

Figure 10:
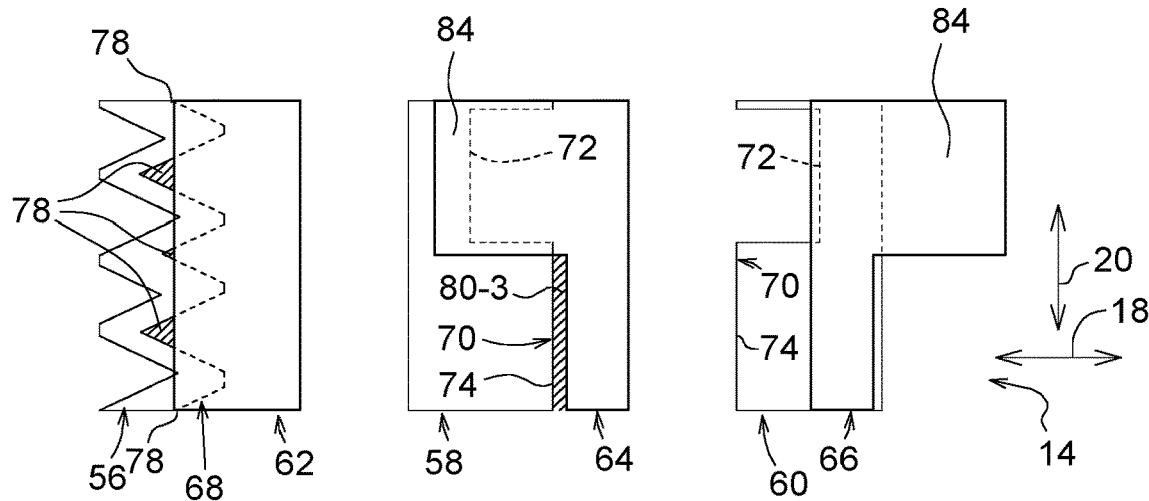
FIG. 10 shows the developed views according to FIG. 9 in an additional working position of the control slide.

Proceeding from the working position according to FIG. 9, the control slide 14 can be transported axially to the left in order to achieve the same regulating flow cross section 78 (FIG. 10) as in FIG. 6. Due to the housing protrusion 84, however, the outlet flow cross section 80-3 at the outlet housing segment 64 according to FIG. 10 is smaller than the outlet flow cross section 80 at the outlet housing segment 64 according to FIG. 6. With the reduced outlet flow cross section 80-3, a throttling of the hydraulic flow in the region of the return port 28 and in the direction of the hydraulic tank connected thereto can be achieved. This causes an increased back pressure and avoids possible cavitation effects in the hydraulic conduction paths within the control valve unit 10.

Figure 11:
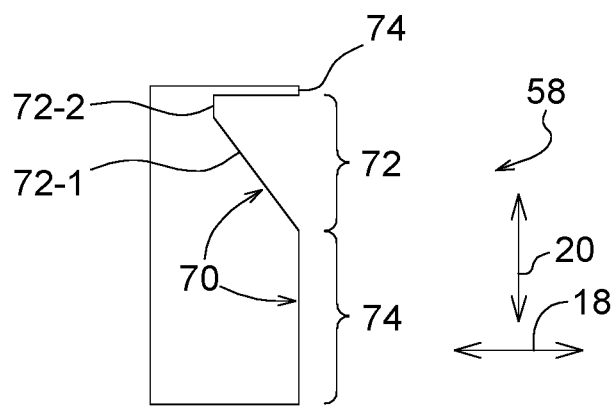
FIG. 11 shows the developed view of the first outlet control segment in an additional embodiment.

FIG. 11 shows another embodiment of the outlet control segment 58. In this embodiment, the axially inner edge portion 72 of the outlet control edge 70 has two sub-portions 72-1, 72-2 succeeding one another in the rotational direction 20. The sub-portion 72-1 runs as a straight line at an angle of greater than 0° and less than 90° (approximately 35° in FIG. 11) relative to the rotational direction 20. The shorter sub-portion 72-2 runs parallel to the rotational direction 20.

Figure 12:
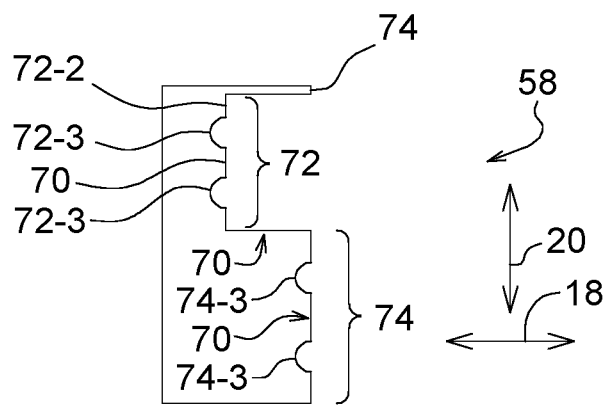
FIG. 12 shows the developed view of the first outlet control segment in an additional embodiment.

FIG. 12 shows another embodiment of the outlet control segment 58. In this embodiment, the axially inner edge portion 72 and the axially outer edge portion 74, in contrast to the variant shown in FIG. 3b, each have two circular arc-shaped sub-portions 72-3 and 74-3.

The features disclosed with reference to the outlet control segment 58 can also or alternatively be implemented, singly or in combination, only on outlet control segment 60. In addition, features illustrated on the basis of a control segment 42, 56, 58, 60 or of a housing segment 44, 62, 64, 66 can be implemented singly or in combination in additional embodiments, alternatively or additionally on a different disclosed control segment or disclosed housing segment.

The illustrated embodiment of the control valve unit 10 is merely for the sake of example. Individual features can be modified in additional embodiments of the control valve unit. For example, functionally or numerically different hydraulic ports can be implemented. The definition, number and arrangement of control segments and housing segments cooperating therewith can also be different in further embodiments of the control valve unit.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic control valve unit configured to actuate a hydraulic working load, comprising:
   a plurality of hydraulic ports comprising an input port configured to be hydraulically coupled to a pump, a working port configured to be hydraulically coupled to the working load, and a return port configured to be connected to a hydraulic tank;
   a control slide movable into different working positions in an axial direction and in a rotational direction about an axis of rotation; and
   a slide housing with an inner diameter that surrounds the control slide such that the control slide is movable in the axial direction and in the rotational direction within the inner diameter of the slide housing to control hydraulic flow between the plurality of hydraulic ports;
   wherein the control slide comprises a first control segment which is delimited in the axial direction by a first control edge;
   wherein the slide housing comprises a first housing segment that cooperates with the first control segment to control a first flow cross section for hydraulic flow within the inner diameter of the slide housing at the first control segment;
   wherein the first control edge of the first control segment in cooperation with the first housing segment is configured to modify size of the first flow cross section at the first control segment based on rotational position of the control slide within the slide housing;
   wherein when the control slide is in a first axial position and a first rotational position within the slide housing, the first control edge of the first control segment in cooperation with the first housing segment is configured to create a disjoint flow cross section at the first control segment within the inner diameter of the slide housing, where the disjoint flow cross section includes separate first and second flow cross section areas; and
   wherein when the control slide is in the first axial position and a second rotational position within the slide housing, where the second rotational position is different from the first rotational position, the first control edge of the first control segment in cooperation with the first housing segment is configured to create a unitary flow cross section at the first control segment within the inner diameter of the slide housing, where the unitary flow cross section includes a single flow cross section area;

wherein the disjoint flow cross section and the unitary flow cross section have different sizes.

2. The control valve unit according to claim 1, wherein the single flow cross section area of the unitary flow cross section is larger than the combined first and second flow cross section areas of the disjoint flow cross section.

3. The control valve unit according to claim 2, wherein the first control edge of the first control segment comprises an axially inner edge portion and an axially outer edge portion, where the axially inner edge portion is offset inwardly in the axial direction relative to the axially outer edge portion;

wherein when the control slide is in the first axial position and the first rotational position within the slide housing, the first flow cross section area of the disjoint flow cross section is between the axially inner edge portion of the first control edge and the first housing segment, and the second flow cross section area of the disjoint flow cross section is between the axially outer edge portion of the first control edge and the first housing segment; and wherein when the control slide is in the first axial position and the second rotational position within the slide housing, the single flow cross section area of the unitary flow cross section is between the axially inner edge portion of the first control edge and the first housing segment.

4. The control valve unit according to claim 3, wherein the axially outer edge portion and the axially inner edge portion extend along the rotational direction.

5. The control valve unit according to claim 3, wherein the axially outer edge portion extends along a portion of the axis of rotation.

6. The control valve unit according to claim 3, wherein the axially inner edge portion extends along the rotational direction at an angle greater than 0° and less than 90° along the rotational direction.

7. The control valve unit according to claim 1, wherein the first control segment of the control slide comprises an inlet control segment hydraulically upstream of the working port to control hydraulic flow to the working port.

8. The control valve unit according to claim 1, wherein the first control segment of the control slide comprises an outlet control segment hydraulically positioned between the working port and the return port to control hydraulic flow to the return port.

9. The control valve unit according to claim 1, wherein the control slide further comprises a second control segment which is delimited in the axial direction by a second control edge:

wherein the slide housing comprises a second housing segment that cooperates with the second control segment to control a second flow cross section for hydraulic flow within the inner diameter of the slide housing at the second control segment;

wherein the second control edge of the second control segment in cooperation with the second housing segment is configured such that for a fixed axial position of the control slide within the slide housing, the second flow cross section at the second control segment is constant in size for any rotational position of the control slide within the slide housing.

10. The control valve unit according to claim 9, wherein the second control segment of the control slide comprises a regulating control segment in an outflow region of the slide housing which connects the slide housing to the input port.

11. A hydraulic control valve unit configured to actuate a hydraulic working load, comprising:

a plurality of hydraulic ports comprising an input port configured to be hydraulically coupled to a pump, a working port configured to be hydraulically coupled to the working load, and a return port configured to be connected to a hydraulic tank;

a control slide movable into different working positions in an axial direction and in a rotational direction about an axis of rotation; and a slide housing with an inner diameter that surrounds the control slide such that the control slide is movable in the axial direction and in the rotational direction within the inner diameter of the slide housing to control hydraulic flow between the plurality of hydraulic ports;

wherein the control slide comprises a first control segment which is delimited in the axial direction by a first control edge, where the first control edge comprises an axially inner edge portion and an axially outer edge portion where the axially inner edge portion is offset inwardly in the axial direction relative to the axially outer edge portion;

wherein the slide housing comprises a first housing segment that cooperates with the first control segment to control a first flow cross section for hydraulic flow within the inner diameter of the slide housing at the first control segment;

wherein the first control edge of the first control segment in cooperation with the first housing segment is configured to modify size of the first flow cross section at the first control segment based on rotational position of the control slide within the slide housing;

wherein when the control slide is in a first axial position and a first rotational position within the slide housing, the first control edge of the first control segment in cooperation with the first housing segment is configured to create a disjoint flow cross section at the first control segment within the inner diameter of the slide housing, where the disjoint flow cross section includes separate first and second flow cross section areas; and wherein when the control slide is in the first axial position and a second rotational position within the slide housing, where the second rotational position is different from the first rotational position, the first control edge of the first control segment in cooperation with the first housing segment is configured to create a unitary flow cross section at the first control segment within the inner diameter of the slide housing, where the unitary flow cross section includes a single flow cross section area;

wherein the disjoint flow cross section and the unitary flow cross section have different sizes.

12. The control valve unit according to claim 11, wherein the single flow cross section area of the unitary flow cross section is larger than the combined first and second flow cross section areas of the disjoint flow cross section.

13. The control valve unit according to claim 11, wherein when the control slide is in the first axial position and the first rotational position within the slide housing, the first flow cross section area of the disjoint flow cross section is between the axially inner edge portion of the first control edge and the first housing segment, and the second flow cross section area of the disjoint flow cross section is between the axially outer edge portion of the first control edge and the first housing segment; and wherein when the control slide is in the first axial position and the second rotational position within the slide housing, the single flow cross section area of the unitary flow cross section is between the axially inner edge portion of the first control edge and the first housing segment.

14. The control valve unit according to claim 13, wherein the axially outer edge portion and the axially inner edge portion extend along the rotational direction.

15. The control valve unit according to claim 13, wherein the axially outer edge portion extends along a portion of the axis of rotation.

16. The control valve unit according to claim 13, wherein the axially inner edge portion extends along the rotational direction at an angle greater than 0° and less than 90° along the rotational direction.

17. The control valve unit according to claim 13, wherein the control slide further comprises a second control segment which is delimited in the axial direction by a second control edge:
   wherein the slide housing comprises a second housing segment that cooperates with the second control segment to control a second flow cross section for hydraulic flow within the inner diameter of the slide housing at the second control segment;
   wherein the second control edge of the second control segment in cooperation with the second housing segment is configured such that for a fixed axial position of the control slide within the slide housing, the second flow cross section at the second control segment is constant in size for any rotational position of the control slide within the slide housing.

18. The control valve unit according to claim 17, wherein the second control segment of the control slide comprises a regulating control segment in an outflow region of the slide housing which connects the slide housing to the input port.

19. A hydraulic control valve unit configured to actuate a hydraulic working load, comprising:
   a plurality of hydraulic ports comprising an input port configured to be hydraulically coupled to a pump, a working port configured to be hydraulically coupled to the working load, and a return port configured to be connected to a hydraulic tank;
   a control slide movable into different working positions in an axial direction and in a rotational direction about an axis of rotation; and
   a slide housing with an inner diameter that surrounds the control slide such that the control slide is movable in the axial direction and in the rotational direction within the inner diameter of the slide housing to control hydraulic flow between the plurality of hydraulic ports;
   wherein the control slide comprises a first control segment which is delimited in the axial direction by a first control edge;
   wherein the slide housing comprises a first housing segment that cooperates with the first control segment to control a first flow cross section for hydraulic flow within the inner diameter of the slide housing at the first control segment;
   wherein the first control edge of the first control segment in cooperation with the first housing segment is configured to modify size of the first flow cross section at the first control segment based on rotational position of the control slide within the slide housing;
   wherein the control slide further comprises a second control segment which is delimited in the axial direction by a second control edge:
   wherein the slide housing comprises a second housing segment that cooperates with the second control segment to control a second flow cross section for hydraulic flow within the inner diameter of the slide housing at the second control segment;
   wherein the second control edge of the second control segment in cooperation with the second housing segment is configured such that for a fixed axial position of the control slide within the slide housing, the second flow cross section at the second control segment is constant in size for any rotational position of the control slide within the slide housing;
   wherein the second control segment of the control slide comprises a regulating control segment in an outflow region of the slide housing which connects the slide housing to the input port.

* * * * *